(12) United States Patent
Arnegaard et al.

(10) Patent No.: US 7,898,904 B2
(45) Date of Patent: Mar. 1, 2011

(54) IMPLEMENTING A NETWORK INFRASTRUCTURE IN A SEISMIC ACQUISITION SYSTEM

(75) Inventors: Truls Arnegaard, Oslo (NO); Ove Brynestad, Asker (NO); Brian Lee Virgin, Asker (NO); Daniel Golparian, Oslo (NO)

(73) Assignee: WesternGeco LLC, Houston, TX (US)

( * ) Notice: Subject to any disclaimer, the term of this patent is extended or adjusted under 35 U.S.C. 154(b) by 193 days.

(21) Appl. No.: 10/532,647

(22) PCT Filed: Nov. 21, 2003

(86) PCT No.: PCT/EP03/50871

§ 371 (c)(1),
(2), (4) Date: Dec. 5, 2005

(87) PCT Pub. No.: WO2004/049006

PCT Pub. Date: Jun. 10, 2004

(65) Prior Publication Data

US 2006/0155758 A1     Jul. 13, 2006

(30) Foreign Application Priority Data

Nov. 22, 2002 (GB) ................................ 0227292.0

(51) Int. Cl.
*G01V 1/00* (2006.01)

(52) U.S. Cl. ....................................................... 367/76

(58) Field of Classification Search .............. 367/76–82
See application file for complete search history.

(56) References Cited

U.S. PATENT DOCUMENTS 3,881,166 A    4/1975   Fort et al.
(Continued)

FOREIGN PATENT DOCUMENTS

EP         1004900 A2    5/2000
(Continued)

OTHER PUBLICATIONS

Johnson, et al. "IP Network Design and Implementation for the Caltech-USGS Element of Trinet." Eos Trans. AGU 82 (47) Fall Meet. Suppl. Abtracts, 2001.*
(Continued)

*Primary Examiner*—Mark Hellner (57) ABSTRACT

A method and apparatus implementing a network infrastructure in a seismic acquisition system are disclosed. The apparatus is a seismic acquisition system, comprising a plurality of seismic data sources (120) capable of generating data; at least one data collection system (140) utilizing an open network protocol; and at least one line network (300) connecting the data sources to the data collection system and utilizing an open network protocol. The line network (300) includes a plurality of data source nodes (130) at which a portion of the plurality of seismic data sources are respectively attached to the line network; and a router (135) for routing data generated by the seismic data sources (120) to the data collection system (140) through the data source nodes (130) in accordance with the open network protocol. The method comprises assigning at least two respective network addresses to each one of a plurality of seismic data sources, a plurality of data source nodes, a plurality of routers, and a data collection system; routing data generated by the data sources through the data source nodes and the routers to the data collection system; correlating the network addresses of the seismic data sources to the physical location of the respective seismic data sources; and correlating the physical locations of the respective seismic data sources to the data generated by the respective seismic data sources.

25 Claims, 8 Drawing Sheets

U.S. PATENT DOCUMENTS

| | | | | |
|---|---|---|---|---|
| 4,885,724 A | * | 12/1989 | Read et al. | 367/77 |
| 5,627,798 A | | 5/1997 | Siems et al. | |
| 6,041,283 A | * | 3/2000 | Sigmar et al. | 702/16 |
| 6,131,119 A | * | 10/2000 | Fukui | 709/224 |
| 6,205,122 B1 | * | 3/2001 | Sharon et al. | 370/254 |
| 6,337,636 B1 | | 1/2002 | Page et al. | |
| 6,430,547 B1 | * | 8/2002 | Busche et al. | 707/1 |
| 6,459,654 B1 | | 10/2002 | Bary et al. | |
| 6,980,929 B2 | * | 12/2005 | Aronstam et al. | 702/188 |
| 7,002,924 B2 | * | 2/2006 | Braun et al. | 370/254 |
| 7,107,329 B1 | * | 9/2006 | Schroder et al. | 709/221 |
| 2002/0071430 A1 | * | 6/2002 | Szyszko | 370/389 |
| 2002/0082811 A1 | * | 6/2002 | Honjas et al. | 703/2 |
| 2002/0136335 A1 | * | 9/2002 | Liou et al. | 375/354 |
| 2004/0252585 A1 | * | 12/2004 | Smith et al. | 367/66 |

FOREIGN PATENT DOCUMENTS

| | | |
|---|---|---|
| GB | 2087680 A | 5/1982 |
| GB | 2272614 A | 5/1994 |
| WO | WO 9807049 A | 2/1998 |
| WO | WO 0151956 A1 | 7/2001 |
| WO | WO 03023448 A2 | 3/2003 |
| WO | WO 2004034677 A2 | 4/2004 |

OTHER PUBLICATIONS

Arescon. "Embedded LINUX in a Soft Real-Time Task: The Canadian Geological Survey Internet Seismometer." Arescon, Sep. 2001.*

* cited by examiner

IMPLEMENTING A NETWORK INFRASTRUCTURE IN A SEISMIC ACQUISITION SYSTEM

BACKGROUND OF THE INVENTION

1. Field of the Invention

The present invention pertains to seismic surveys, and, more particularly, implementing a network infrastructure in a seismic acquisition system.

2. Description of the Related Art

Seismic acquisition systems typically are used in seismic surveys. In a seismic survey, an array of seismic receivers is deployed in a selected area. One, and usually more, seismic sources are also deployed. The sources impart acoustic signals into the ground that are reflected and refracted by subterranean formations back to the receivers. The receivers then transmit data indicative of selected characteristics of the reflections to a data collection system. The data collection system then collects the data, processes and/or pre-processes it, and, typically, transmits to another location for further processing.

Seismic surveys can be generally categorized as land-based and water-based (or, "marine"), i.e., by whether they are conducted on land or in the water. Each implicates challenges unique from the other. For instance, in a marine survey, the seismic sources are usually towed at or near the surface of the water. The acoustic signals must therefore propagate through the water before they are imparted into the ground, or sea floor. In contrast, sources in a land-based survey can impart the acoustic signals directly into the ground.

However, there are also numerous challenges arising from both these kinds of surveys. One challenge is to accurately know the physical position of the sources when they impart the acoustic signals and of the receivers when they receive the reflections. Also, a modern seismic acquisition operation requires data to be collected from a large number of individual units; sources, position sensors, seismic sensors, etc. These units act as data sources in the operation. Usually a number of separate data collecting systems are involved in the operation, each employing their own infrastructure and method for connecting the data sources to the data collecting systems. These connectivity infrastructures are optimised to be fit for their particular purpose, and have therefore often wildly differing characteristics and means of operation. Introducing a new data source, and/or a new data collecting system into the operation requires the introduction of a new connectivity infrastructure, adding complexity to the total system. Alternatively, an existing infrastructure may be adapted to carry the new information. However, this will often be a complex task in itself.

The present invention is directed to resolving, or at least reducing, one or all of the problems mentioned above.

SUMMARY OF THE INVENTION

The invention, in its various aspects and embodiments, comprises a method and apparatus implementing a network infrastructure in a seismic acquisition system. The apparatus is a seismic acquisition system, comprising a plurality of seismic data sources capable of generating data; at least one data collection system utilizing an open network protocol; and at least one line network connecting the data sources to the data collection system and utilizing an open network protocol. The line network includes a plurality of data source nodes at which a portion of the plurality of seismic data sources are respectively attached to the line network; and a router for routing data generated by the seismic data sources to the data collection system through the data source nodes in accordance with the open network protocol. The method comprises assigning at least two respective network addresses to each one of a plurality of seismic data sources, a plurality of data source nodes, a plurality of routers, and a data collection system; routing data generated by the data sources through the data source nodes and the routers to the data collection system; correlating the network addresses of the seismic data sources to the physical location of the respective seismic data sources; and correlating the physical locations of the respective seismic data sources to the data generated by the respective seismic data sources.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
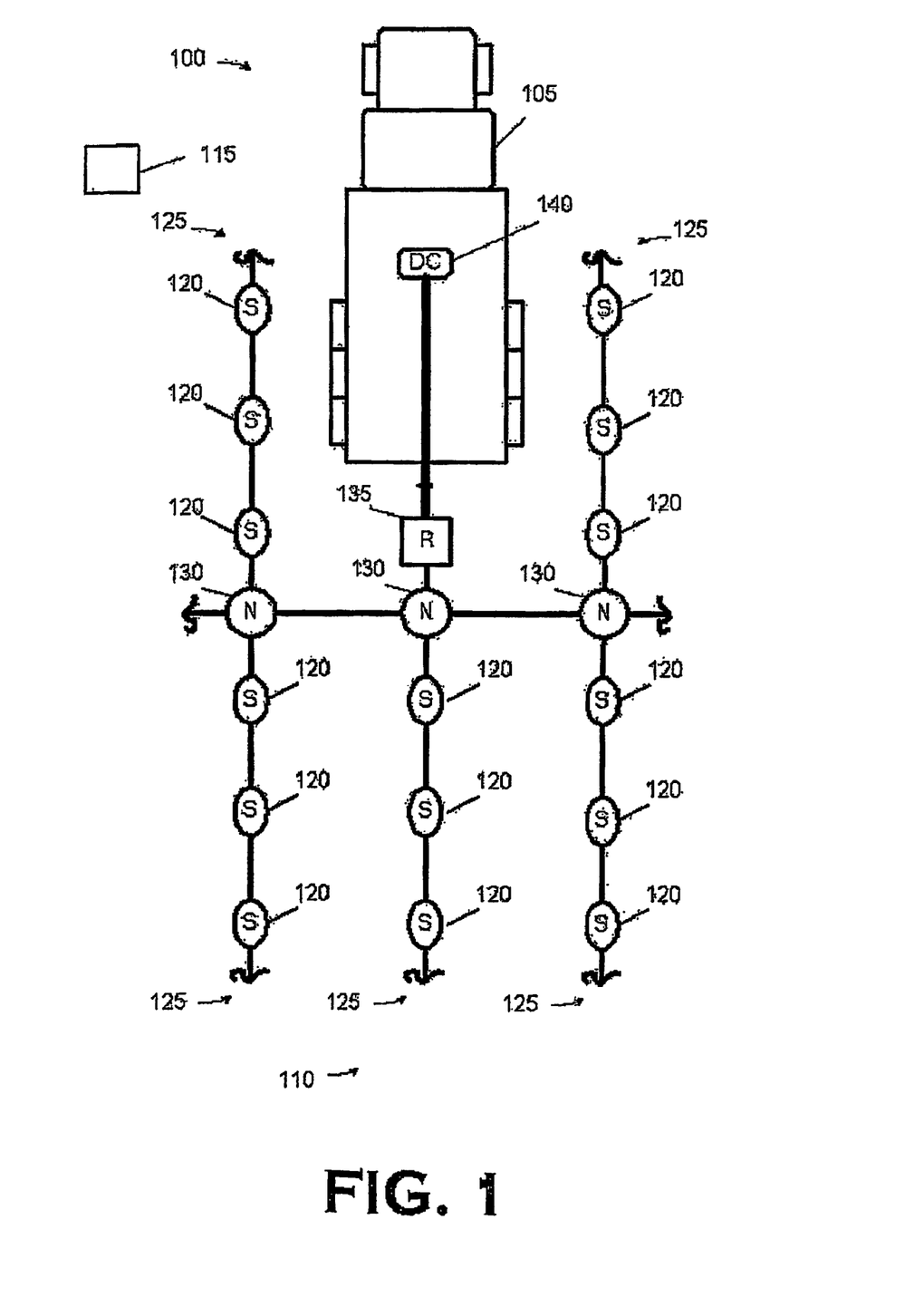
FIG. 1 depicts the conduct of a seismic survey in accordance with one aspect of the present invention including a recording array connected to a data collection system.

FIG. 1 depicts the conduct of a seismic survey system 100 in accordance with one aspect of the present invention. The seismic survey system 100 is a land-based survey system. The seismic survey system 100, accordingly, includes a recording truck 105 connected to a seismic array 110, which is a recording array in the illustrated embodiment. The recording array 110 includes a plurality of seismic data sources 120, such as, for example, seismic sources (e.g., vibrators, explosive charges), positioning sensors (Global Positioning System ("GPS") sensors), seismic receivers (geophones), etc., on a plurality of lines 125. More typically, however, seismic sources, e.g., the seismic source 115, are not a part of the recording array 110. The recording array 110 also includes a plurality of nodes 130 and at least one router 135, whose function will be discussed further below.

The seismic survey system 100 includes at least one data collection system 140. Note that some alternative embodiments may employ multiple data collection systems 140. The recording truck 105 is equipped with a rack-mounted computing apparatus 200, illustrated in FIG. 2A and FIG. 2B, with which at least a portion of data collection system 140 is implemented. The computing apparatus 200 includes a processor 205 communicating with some storage 210 over a bus system 215. The storage 210 may include a hard disk and/or random access memory ("RAM") and/or removable storage such as a floppy magnetic disk 217 and an optical disk 220. The storage 210 is encoded with a data structure 225 storing the data set acquired as discussed above, an operating system 230, user interface software 235, and an application 265. The user interface software 235, in conjunction with a display 240, implements a user interface 245. The user interface 245 may include peripheral 10 devices such as a key pad or keyboard 250, a mouse 255, or a joystick 260. The processor 205 runs under the control of the operating system 230, which may be practically any operating system known to the art.

Figure 2A:
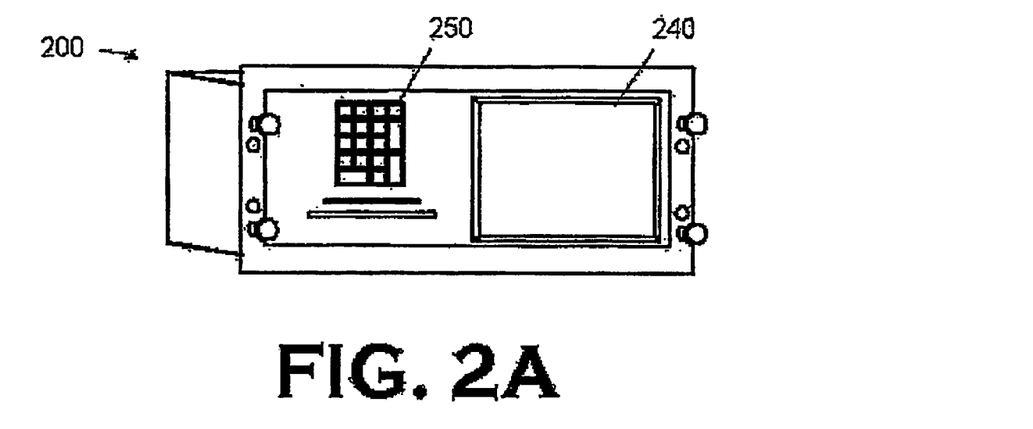
FIG. 2A conceptually depicts a computing system such as may be used in implementing certain aspects of the present invention-namely, portions of the data collection system.
Figure 2B:
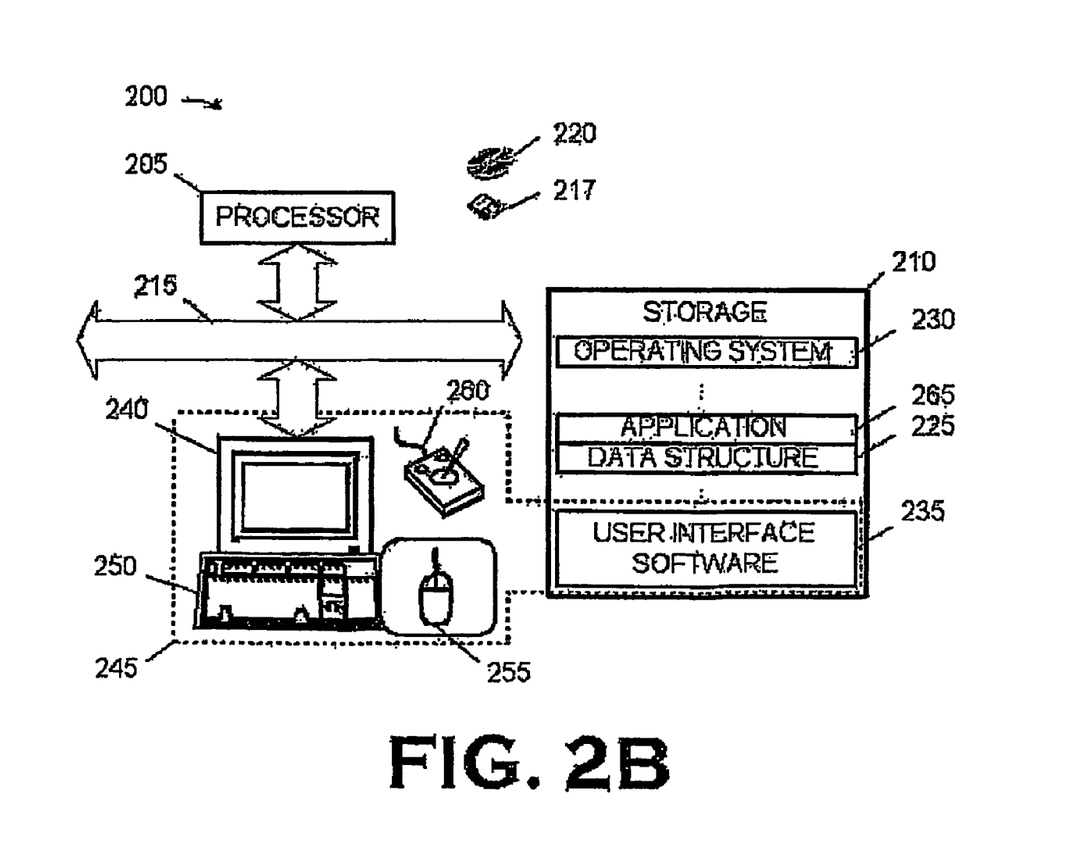
FIG. 2B is a block diagram of selected components of the hardware and software architectures of the computing system in FIG. 2A.

The application 265 is invoked by the operating system 230 upon power up, reset, or both, depending on the implementation of the operating system 230, to administer an open network protocol on the recording array 110. The administration of this open network protocol imposes a network infrastructure on the seismic acquisition system 100 with which the seismic survey is being conducted. A network, in a general sense, is a plurality of functionally interconnected computing systems. Note that a computing system may be as simple as a single computing device (e.g., a controller or processor) or as complex as many individual computers. A network protocol (or, more simply, a "protocol") is an agreed upon format for transmitting information between computing devices. A protocol typically specifies transmission characteristics such as error checking, data compression, end of message indicators, and return receipts. Practically any open network protocol may be employed, but one particular implementation employs, e.g., the Internet Protocol ("IP") suite. "Open" standards are simply standards promulgated by industry groups that are available to the public. The IP protocol suite, in particular, specifies a format for "packets," or datagrams, that may be addressed to a recipient and then dropped into the network for delivery.

Thus, in the illustrated embodiment, a single IP-based network (i.e., the recording array 110, data collection system 140) is deployed between the different data sources 120 and data collection system(s) 140, allowing communication between data sources 120 and data collection system(s) 140 over any protocol supported on top of IP, which includes most modern, open protocols. In addition, the node-to-node nature of such a spread network allows communication between the plurality of data sources 120 and, separately, between the plurality of data collection system(s) 140, thereby opening a broad range of possible applications. Several features of the IP protocol suite are particularly useful as applied to the seismic acquisition scenario. The generic and wide-spread nature of IP simplifies adapting new services and applications to the seismic acquisition system. The protocols comprising the IP protocol suite support dynamically update routing information, which is important in supporting fault tolerance and high availability.

Figure 3:
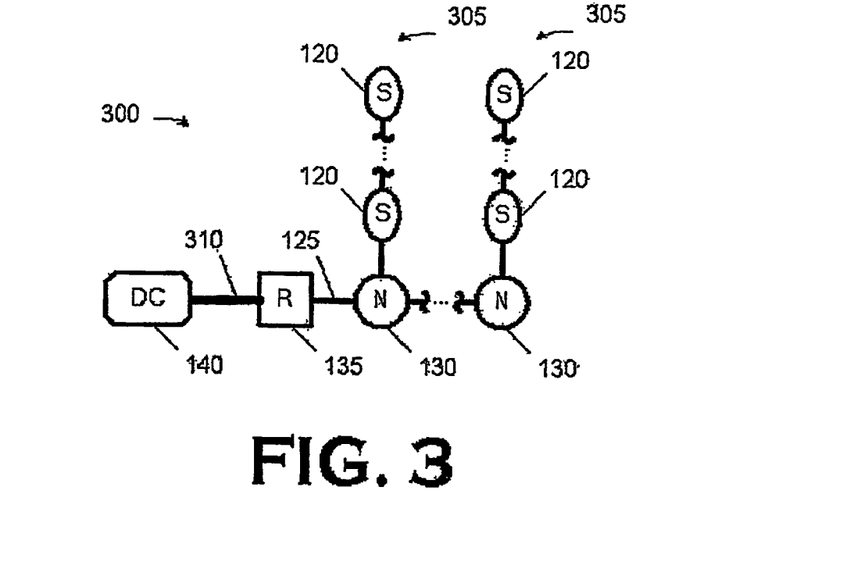
FIG. 3 illustrates a single line network, the elemental building block of the recording array in FIG. 1, connected to the data collection system.

FIG. 3 illustrates a single line network 300, the elemental building block of the recording array 110 in FIG. 1, connected to the data collection system 140. The line network 300 comprises a single router 135 connected between the data collection system 140 and a plurality of nodes 130. The nodes 130 are connected to the line 125. Each node 130 is, in turn, connected to a string 305 of data sources 120. The data sources 120 may be any mix and match of the typical types of equipment used in seismic surveys, e.g., sources, position sensors, seismic sensors, etc. Each of the data collection system 140, the router 135, the nodes 130, and the data sources 120 is assigned a unique, network address in accordance with the network protocol administered by the data collection system 140.

The data source nodes 130 themselves are connected by means of a medium-bandwidth, IP-based network. The data source nodes 130 will typically be intelligent units, capable of both initiating and participating in communications sessions with other data source nodes 130 and with the data collection system(s) 140. The data source nodes 130 are connected in-line, each data source node 130 connected to at most two neighbouring data source nodes 130 in the illustrated embodiment. A number of data source nodes 130 will typically be connected together, forming a string of data source nodes 130, as will be discussed further below. Terminating such a string will be a network router 135. The router 135 is a computing device that connects multiple, relatively small networks—such as the line network 300—together. Multiple line networks 300, other routers 135, or data collection systems 140 may be connected to a single router 135.

The seismic data sources 120 package data into packets (not shown), each of which contains not only data, but a variety of other information. Some of this information is in what is known as the "header" of the packet. The header typically contains the network address of the destination for the packet, e.g., the data collection system(s) 140. The router 135 uses this information in the headers of the packets from the seismic data sources 120 and a lookup table (not shown) stored on router 135 to determine the packet's destination. The router 135 then communicates with other routers 135 to determine the best path to that destination through the larger network as a whole. In the illustrated embodiment, the routers 135 communicate among each other using a second open protocol called Open Shortest Pass First ("OSPF"), although alternatives might include Internet Control Message Protocol ("ICMP"), which is a well known extension to the IP protocol suite. Still other open protocols may be used in alternative embodiments. Thus, the router 135 behaves in the illustrated embodiment as a standard IP network router, routing traffic to and from the data source nodes 120 on the line networks 300 connected to the router 135, as well as traffic to and from the other routers 135 connected to it.

The connections among the seismic data sensors 120, seismic source nodes 130, the router 135, and the data collection system 140 are all designed to accommodate the amount of network traffic expected to be travelling thereon. The line 125 implements, in the illustrated embodiment, a medium-bandwidth data path. The connection 310 is a high-bandwidth data path, sometimes referred to in networking parlance as the "backbone." In the illustrated embodiment, the connection 310 and the line 125 are both electrical, and may be implemented using any suitable electrical technology known to the art. For instance, twisted wire pairs and shielded coaxial cables might be employed in various embodiments. However, this is not required for the practice of the invention. The connection 310 and line 125 may alternatively be optical fibres, for instance, or a wireless system.

The precise parameters regarding the bandwidth of the line 125 and connection 310 will be implementation specific, depending on the number of components (e.g., seismic data sources 120, data source nodes 130, routers 135, and data collection systems 140), the particular protocol implemented, and the structure of the recording array 110. However, those in the art having the benefit of this disclosure will be able to readily determine these parameters based on standard networking principles and the specifications of the applicable protocols. Furthermore, whether the line 125 or the connection 310 is "high" bandwidth or "medium" bandwidth is not material to the practice of the invention so long as they have the capacity to handle the traffic thereon for the given implementation.

Figure 4:
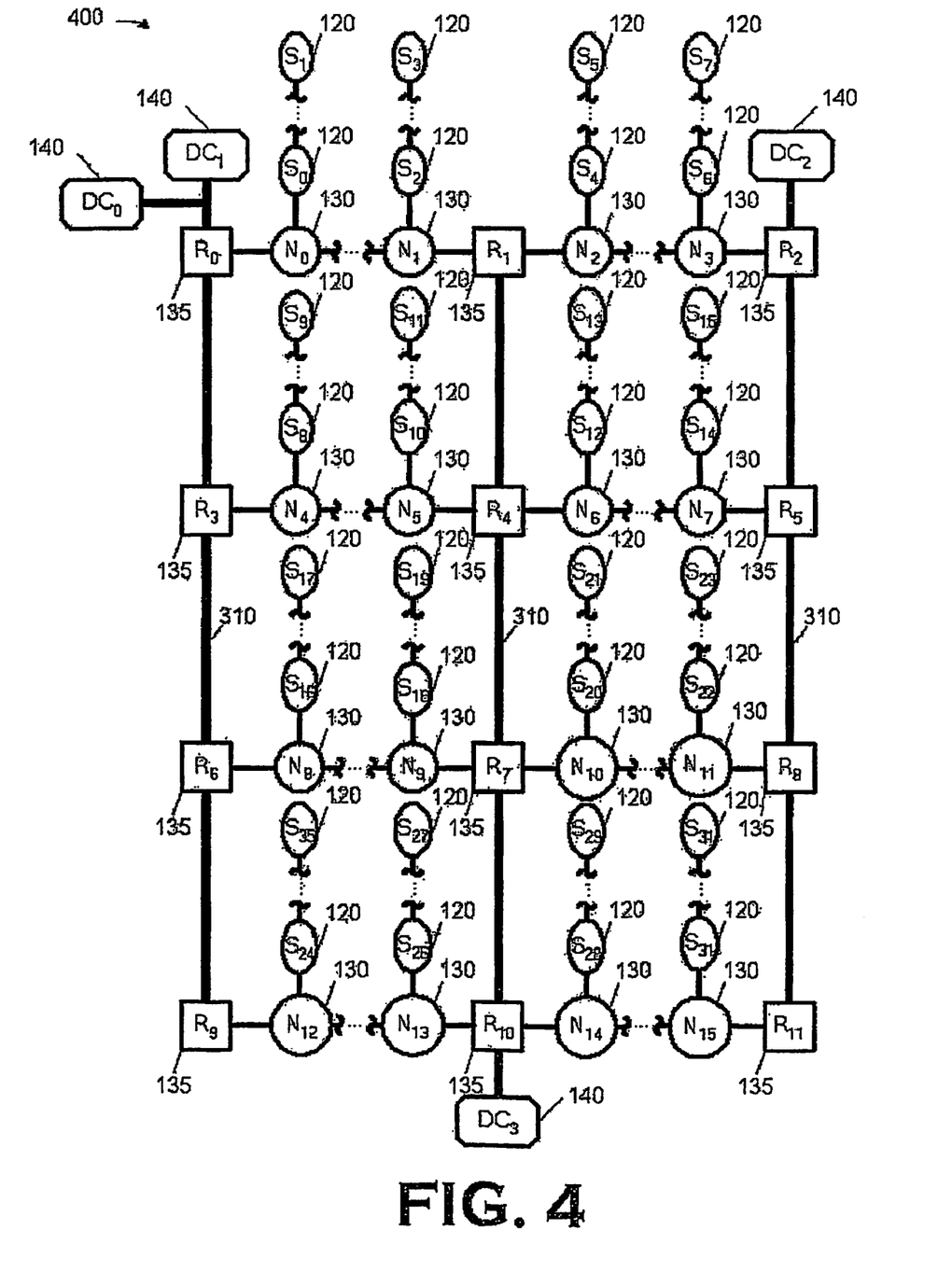
FIG. 4 illustrates one particular implementation of the recording array in FIG. 1 in which multiple line networks, such as that illustrated in FIG. 3, are employed to facilitate fault tolerance and spread coverage.

Although the line network 300 of FIG. 3 can be used in isolation to conduct a survey, a recording array (e.g., the recording array 110 in FIG. 1) will typically comprise several line networks 300. FIG. 4 illustrates one particular implementation 400 of the recording array 110 in FIG. 1 in which multiple line networks, such as the line network 300 in FIG. 3, are employed to facilitate fault tolerance and spread coverage. The degree of fault tolerance and/or spread coverage will be highly implementation specific, depending on the number and arrangement of the line networks 300 therein. Note, however, that various alternative embodiments may employ the invention without necessarily using this "modular" approach.

More particularly, the survey apparatus 400 includes multiple data collection units 140 (i.e., $DC_0$-$DC_3$), multiple routers 135 (i.e., $R_0$-$R_{11}$), multiple data source nodes 130 (i.e., $N_0$-$N_{15}$), and multiple seismic data sources 120 (i.e., $S_0$-$S_{31}$). Note that the precise numbers of the different types of components is not material to the practice of the invention, nor are the ratios. For instance, an alternative embodiment might employ only a single data collection unit for the same number of routers, data source nodes, and seismic data sources. The precise numbers of the various pieces of equipment will be implementation specific. Note that, although not necessarily required to practice the invention, each router 135 is connected to a data collection system 140 by a backbone 310.

In the embodiment of FIG. 4, a break in more than one line or backbone will be survivable as long as more than one backbone and line are available, and they do not affect the same line; not all backbones are broken at the same link 'latitude'; and not all lines are broken. For instance:

a break between the router $R_3$ and the data source node $N_4$ and a break between the data source node $N_5$ and the router $R_4$ (i.e., in the same link "latitude") will drop the data source nodes 130 (e.g., $N_4$, $N_5$) and the associated seismic data sources 120 (e.g., $S_8$-$S_{11}$) from the survey; and a break in the backbone 310 between the routers $R_3$, $R_6$, in the backbone 310 between the routers $R_4$, $R_7$, and in the backbone between the routers $R_5$, $R_8$ will drop all components "below" the routers $R_3$-$R_5$ from the survey.

In general, however, the survey apparatus 400 exhibits relatively high fault tolerance. Furthermore, combinations of line and backbone network link failures may be survivable depending on the exact locations of the breaks.

Additional data collection systems 140 can be added to the spread network at any router 135. There may be more than one data collection system 140 connected, and the data collection systems 140 (e.g., $DC_2$, $DC_3$) may be connected at separate routers 135. The data collection systems 140 (e.g., $DC_1$, $DC_2$, $DC_3$) serve as local data collection points collecting data off a respective backbone that they then forward to a designated, central collection data system 140 (e.g., $DC_0$). The physical area that may be covered by a spread network (e.g., the spread network 400) will be limited by the distance limitations of the network hardware. In addition, it may be limited by the maximum bandwidth of the line network The routers 135 may be connected to more than one line network (e.g., $R_1$, $R_4$, $R_7$, $R_{10}$), thus it will be possible to extend the spread network beyond the limitations of one line network by adding multiple line networks in the in-line direction. To utilize such a topology one might either add multiple high bandwidth network links to one data collection system 140 as in FIG. 1, or add multiple, parallel, data collection systems 140 that collect data from separate parts of the spread network as in FIG. 4.

Another advantage of the spread network of the present invention is that dynamic muting and load balancing techniques can be used to determine which data collection system 140 a given seismic data source 120 should communicate with. Depending on the configuration and topology of the spread network, different channels, routers 135, or data collection systems 140 might receive different levels of traffic. At different times, some routers 135 or data collection systems 140 may be busy while others may be idle. Some might even be borderline overwhelmed by the level of traffic. The traffic load on various components such as routers 135 and data collection systems 140 might also vary over time from very busy to very idle. For instance, traffic levels may change over time as new seismic data sources 120 are added, old ones removed, or network failures impact the performance of the spread network.

Dynamic routing and load balancing techniques have been developed for computing networks to accommodate these types of concerns. These techniques monitor network traffic patterns and adjust network operation to ameliorate the burdens on individual components. These techniques can be applied to the spread network of the present invention to help order traffic therein, adapt to unforeseen exigencies such as equipment failures. Dynamic routing and auto configuration of the network will also facilitate varying the layout and topology of the spread network. This will be particularly useful in "rolling" the spread during seismic operations.

The open standard-based IP network of the illustrated embodiment is extended with three features adapted to the seismic acquisition environment. One is a synchronization service allowing different data source nodes 130 on the spread network (e.g., 100 or 400) to have real-time clocks that are closely synchronized. Seismic surveying, in general, employ tighter synchronization than do the computing networks for which the open-protocols have been developed. Hence, the use of the synchronization service. The second is a location mapping service enabling the spread network to easily convert a network address to a logical location and vice versa. Seismic surveying also "peg maps" the logical location of the seismic data sources 120 to their location in the network. Thirdly, the spread network will support auto-configuration of the network infrastructure itself, e.g. not only will it be possible to dynamically add and remove clients (endpoints) from the active network, but also routers. This is useful not only when performing maintenance and repair of malfunctioning components, but also when 'rolling' the seismic spread during normal seismic surveying operations.

Figure 5A:
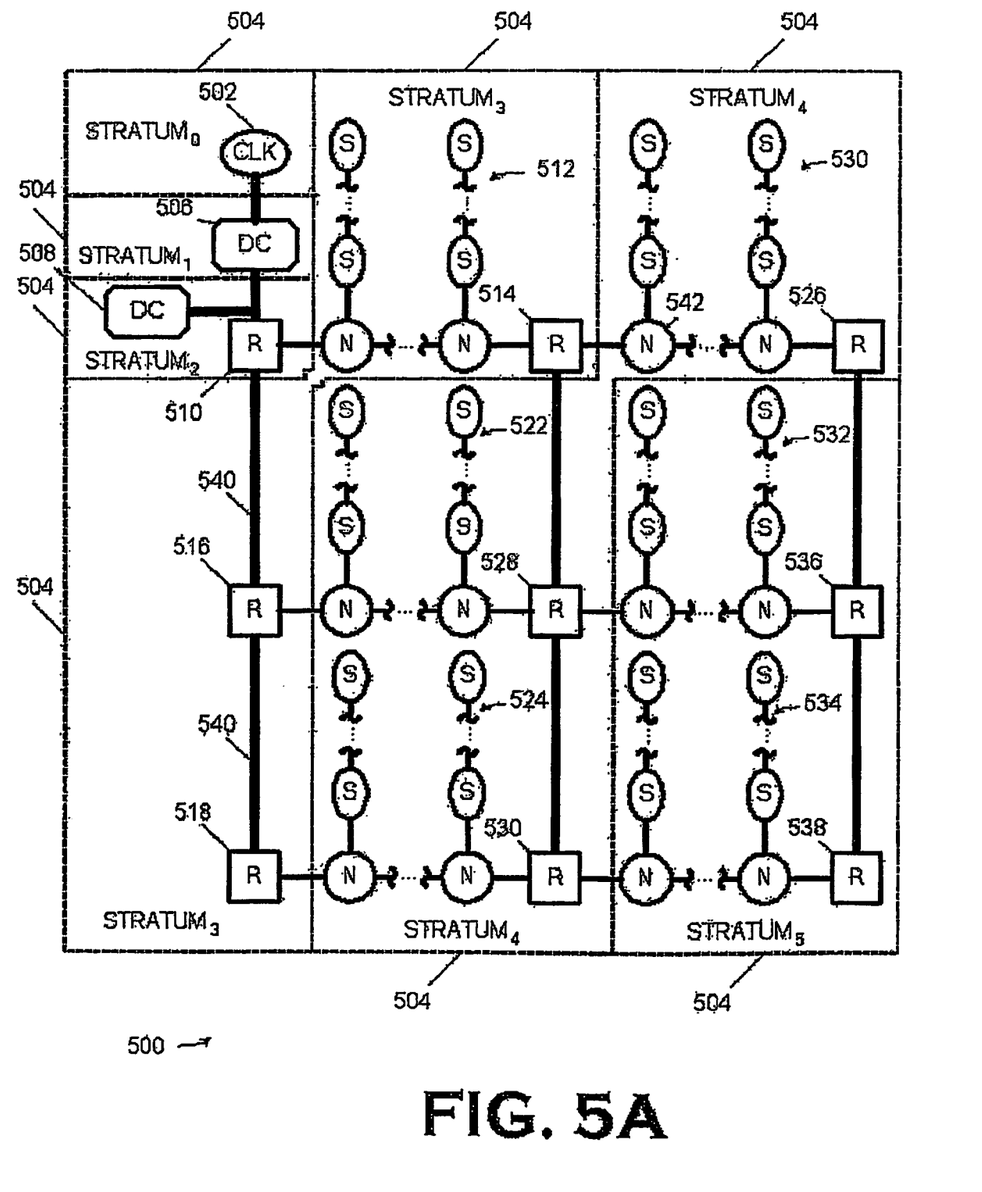
FIG. 5A illustrates timing domains of a synchronization technique employed in one particular implementation of the recording array in FIG. 1 in accordance with the Network Time Protocol ("NTP") of the Internet Protocol ("IP") suite of protocols.

Turning first to the synchronization service, FIG. 5A illustrates timing domains employed in one particular implementation of the recording array 110 in FIG. 1. This particular embodiment employs the Network Time Protocol ("NTP") of the Internet Protocol ("IP") suite of protocols. NTP assures accurate synchronization to the millisecond of computer clock times in a network of computers. In a standard networking application, NTP synchronizes client workstation clocks to the U.S. Naval Observatory Master Clocks in Washington, D.C. and Colorado Springs, Colo. Running as a continuous background client program on a computer, NTP sends periodic time requests to servers, obtaining server time stamps and using them to adjust the client's clock. The present invention employs NIP in the same fashion.

The IP protocol NTP is extended with propagation delay measurement to provide sub microsecond accuracy. One data collection system 140 is assigned to be the active synchronization master at any one time. The active synchronization master is referred to as "Stratum 1" in NTP parlance. Synch masters will have access to an external accurate time source (e.g., a Global Positioning System, or "GPS," receiver) referred to as "Stratum 0." Alternate synch masters can be defined, and they can use the mechanism for time distribution described below to verify the integrity of their respective time sources.

More particularly, the underlying network implementation supplies accurate time distribution and clock synchronization features. These primitives are used to recursively distribute the real-time as supplied by an "active synchronization master." First, the primitives transmitted iteratively from the active synchronization master (stratum 1) to the router on the backbone connected to the master. This router will then be a backbone network synch master (stratum 2) and will synchronize all routers on the backbone (stratum 3). Subsequently, each router will synchronize all line nodes connected to it (stratum 3 or 4). Only the backbone to which the synch master of the moment is connected will be synchronized directly from the active synchronization master. Other backbone networks will have their own network synch masters. These network synch masters will take synch from the line network connecting them to the higher-level stratum. Data collection systems connected to the spread network can be configured to be synchronization clients, e.g., they can be accurately synchronized with the line nodes, and with other data collection systems without having their own time reference systems.

Returning now to FIG. 5A, the spread network 500 comprises multiple data collections systems DC, routers R, data source nodes N, and seismic data sources S as discussed above. The spread network 500 also includes a GPS receiver 502 that provides a clock CLK for the spread network 500. The spread network 500 comprises a plurality of synchronization strata 504 defined as described above in accordance with the NTP IP protocol. The strata 504 are designated $STRATUM_0$-$STRATUM_5$. The GPS receiver 502 is $STRATUM_0$. The data collection system 506, connected to the GPS receiver 502, is the designated synchronization master and constitutes $STRATUM_1$. The data collection system 508 and router 510, connected between the data collection system 506 and the rest of the spread network 500, constitutes $STRATUM_2$. The line network 512 of the routers 514, 516, 518 are connected between $STRATUM_2$ and the rest of the spread 500. They consequently constitute $STRATUM_3$. Similarly, the line networks 520, 522, 524 of the routers 514, 516, 518, respectively, constitute $STRATUM_4$. The routers 526, 528, 530 are also a part of $STRATUM_4$. Finally, the line networks 532 and 534 of the routers 528, 530, respectively, and the routers 536, 538 constitute $STRATUM_5$.

The synchronization begins as the data collection system 506, acting as the active synchronization master, passing the primitives to $STRATUM_2$. The data collection system 508 and router 510 are then synchronized to the clock of the data collection system 506. The router 510 then assumes the role of "backbone network synch master" for the backbone 540 and the routers 516 and 518 on the backbone 540. The router 510 is also the synch master for the router 514 on the line network 512. As mentioned above, each router R synchronizes the lines nodes, including both data source nodes N and routers R, on the lines to which it is connected.

Thus, the router 510 passes the primitives to each of the routers 514, 516, 518 in $STRATUM_3$. Each of the routers 514, 516, 518, in turn, then passes the primitives to the line nodes on the lines connected thereto. The router 514 therefore passes the primitives to the nodes N and routers R on the line network 520, the router 516 does the same on the line network 522, and the router 518 for the line network 524. Thus, the routers 526, 528, 530 in $STRATUM_4$ are synched to the routers 514, 516, 518, respectively, in $STRATUM_3$. The routers 528, 530 then pass the primitives to the routers 536, 538, respectively, in $STRATUM_5$. If additional line networks and/or routers and/or data collection systems are added, they can be synchronized to the rest of the spread network 500 in the same iterative fashion across additional strata defined in accordance with the NIP protocol.

It can be shown that the synchronization error of this approach is proportional to $\sqrt{n_{hops}}$ where $n_{hops}$ is the number of discrete network link hops from stratum 0. As will be appreciated by those skilled in the art having the benefit of this disclosure, a "network link hop" occurs with the regeneration of network time stamps using local real-time clocks. Thus, in the embodiment of FIG. 5A, there is a "network link hop" between each of the strata $STRATUM_0$-$STRATUM_5$. The hierarchical scheme imposed by the NTP protocol keeps $n_{hops}$ small relative to the total size of the spread network 500. Note that alternate routing for synchronization is possible using exactly the same fail over and rerouting protocols as for data traffic. That is, in FIG. 5A, a node N (e.g., the node 542) will by default be synchronized by a router R (e.g., the router 514). But, another router R (e.g., the router 510) is also available and able to supply synchronization to the node N, albeit in a higher stratum. The ability to supply synchronization along multiple paths also allows time and synchronization verification in the spread network 500. This may be done, e.g., by comparing multiple synchronization sources against each other.

Figure 5B:
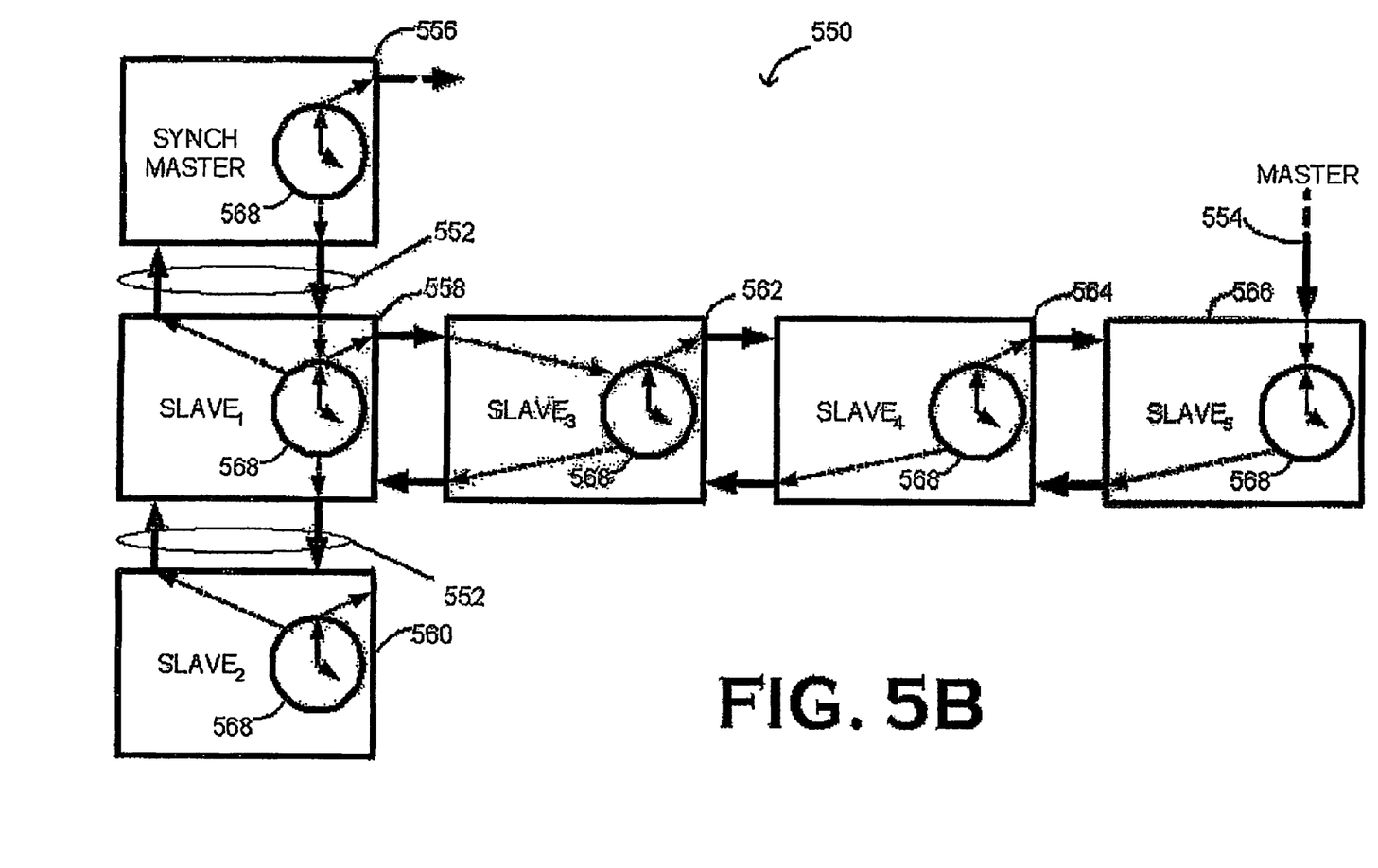
FIG. 5B illustrates a synchronization technique alternative to that in FIG. 5A.

An alternative synchronization technique is illustrated in FIG. 5B. The underlying principle of this spread synchronization technique is "local Real Time Clock" ("RTC") adjustment using:

timestamps, corresponding to uniquely identifiable transmission events, distributed by one or more synchronization masters;

RTC sampling by synchronization slaves triggered by the corresponding reception events;

deterministic propagation delay separating transmission and reception events; and measurement of this propagation delay.

The local RTC error is assumed to be the difference between the locally measured reception time and (timestamp+propagation delay). The illustrated embodiment assumes that the transmission event used for synchronization is the moment at which the first bit of the frame containing a timestamp is clocked onto the line.

RTC synchronization with (sub) micro second accuracy is desirable for seismic acquisition. This level of accuracy generally cannot be achieved if propagation delays, timestamp generation and RTC sampling are not sufficiently deterministic, as is the case with NTP. Fault tolerance and auto configurability generally cannot be achieved if timestamps are distributed by a single source along fixed routes whose delays are measured during system boot. Similarly, bit synchronous networks, where local transmission clocks are derived from those recovered from incoming signals, couple spread synchronization to the initial spread topology.

The primary techniques for decoupling spread synchronization from global topology in the illustrated embodiment are:

regenerating timestamps throughout the spread using local RTCs;

controlling local transmission clock signals locally; and measuring propagation delays only from the nearest points of regeneration.

In order to give maximum flexibility and minimum inter-node dependence, each node in the spread will generate timestamps using its RTC. Frames containing timestamps will also include values indicating the number of hops from, and the stratum value (e.g. clock quality) of, the spread synchronization master. These additional values will be used to auto configure a master—slave hierarchy with respect to clock adjustments, assuring that all RTCs in the spread converge towards that of the spread sync master. Each node in the spread—except the spread sync master—slaves itself to the neighbour providing the best acceptable timing information. Until timing information of an acceptable stratum becomes available, nodes remain unsynchronised.

FIG. 5B illustrates the flow of timing information in a fragment 550 of a spread having two backbones 552, 554 connected to the same synchronization master 556. The synchronization master 556 may be, for instance, a data collection system with access to a GPS receiver to provide a clock in the manner of the data collection system 506 and GPS receiver 502 in the embodiment of FIG. 5A. Returning to FIG. 5B, note that each of the synchronization master 556, and slaves 558, 560, 562, 564, 566 each have a RTC 568. Note that each of the slaves 562, 564, 566 are slaved to the RTC 568 of their neighbour, i.e., the slaves 558, 562, and 564, respectively. The slaves 562, 564, 566 may be seismic data sources, data source nodes, routers, or data collection systems. The slaves 558, 560 are slaved to their neighbours, the slave 558 and the synchronization master 556, respectively. The slaves 558, 560, in the illustrated embodiment, are routers.

Each point of timestamp regeneration introduces a potential new source of clock drift and jitter. However, basic statistical principles dictate that in the absence of systematic errors the expected accumulated clock error grows only as the square root of the number regeneration points traversed, i.e., $\sqrt{n_{hops}}$. Note that this is the same as for the embodiment of FIG. 5A. In the illustrated embodiment, there are no hops to the synchronization master 556, there is one hop to the slaves 558, 566, and there are two hops to the slaves 552, 562, and 564.

This "domino synchronization" scheme illustrated in FIG. 5B only measures propagation delay between immediate neighbours, as the timestamps used by a node to adjust its RTC will be generated by one of its neighbours. Because nodes synchronize themselves using only information from their immediate neighbours, the spread topology can change without seriously disrupting spread synchronization. The basic elements of the scheme are thus:

auto configuration of the (nearest neighbour) master-slave hierarchy, regular propagation delay measurements between immediate neighbours; and RTC adjustments.

Note that this scheme provides fail over as for data traffic. More particularly, if the link between a node and the neighbour acting as its synchronization master fails, the node can switch to any other neighbour providing acceptable timing information. Note further that data collection systems connected to the spread network can be configured to be synchronization clients, e.g. they can be accurately synchronized with the line nodes, and with other data collection systems without having their own time reference systems.

Turning now to the location mapping service, the order and orientations (e.g., 180° rotations) of data source nodes N are determined to perform "peg mapping." That is, this information is determined to generate a mapping between seismic survey topology (e.g., lines and receiver points) and network topology. The peg mapping is performed because the absence of true geographical positioning information for data source nodes N and their seismic data sources S. Peg mapping is not typically a part of open networking standards, although it is performed in conventional, proprietary protocols. Therefore an additional protocol—mapping node order, node orientation, and defining topology events—is used in conjunction with the open protocol. Topology events include: link up, link down (or node failure) plus node address change. Local location information is collected by the routers R and made available, as a service, to interested applications. Peg mapping techniques used on conventional proprietary networks may be employed for this purpose.

Finally, auto configuration of the network infrastructure simplifies flexible deployment and helps automate reconfiguration, e.g., for spread roll and line fault recovery. The core of the auto configuration scheme employed in this particular embodiment is hierarchical addressing coupled with a hierarchy of configurable configuration servers that use contention to resolve conflicts. Note, however, that alternative addressing and contention approaches may be used in alternative embodiments.

Network addresses in the illustrated embodiment consist of a network number part and a node part in accordance with the open protocol applied as discussed above. Network numbers at a particular level in the hierarchy are generated by combining network and nodes numbers from the next higher level using what is basically a left shift (or promotion) of the node part. This addressing may be performed in conventional fashion.

The illustrated embodiment couples this hierarchical addressing with a hierarchy of configurable "configuration servers." The configuration servers also operate in a hierarchical fashion. Three levels of configuration servers are defined in the illustrated embodiment:

a unique root server (with zero or more backup servers for redundancy), which allocates backbone numbers;

backbone servers, one per backbone, which allocate backbone addresses having a network part based on backbone number, and line network servers, one per line network, which allocate line network addresses having a network part based on router backbone-port addresses.

Note that, in alternative embodiments, different levels may be employed in addition to, or in lieu of, those listed above.

For instance, referring now to FIG. 4, assume the data collection unit $DC_1$ has been designated as the unique root server. The data collection unit $DC_1$ configures itself and passes configuration information to the backbone servers. In the illustrated embodiment, the backbone servers would be the routers $R_0$, $R_1$, and $R_2$. The backbone routers configure themselves and then pass configuration information on to the line network servers. For example, the routers $R_1$, $R_2$, $R_4$, $R_5$, $R_7$, $R_8$, $R_{10}$, and $R_{11}$ may be line network servers. The line network servers then configure themselves. Note that the redundancy of the configuration in FIG. 4 provides an alternative configuration, as well. For instance, the data collection unit $DC_2$ may be the unique root server, the routers $R_2$, $R_5$, $R_8$, and $R_{11}$ may be the backbone servers, and the routers $R_0$, $R_1$, $R_3$, $R_4$, $R_6$, $R_7$, $R_9$, and $R_{10}$ may be the line network servers.

Conflicts between two peer-level configuration servers (i.e., root vs. root, backbone vs. backbone, or line network vs. line network) are resolved through contention. In the illustrated embodiment, the greater of two unique numerical box identifiers wins. Consider, for instance, a scenario in which both the data collection unit DC, and the data collection unit $DC_2$ have both inadvertently been designated as the root server. This would be undesirable because they might assign the same addresses to different backbone routers or different addresses to the same backbone router. Once the data collection units $DC_1$, $DC_2$ become aware of the conflict, they resolve the contention by comparing the unique identifiers. The data collection unit 140 having the lowest unique identifier backs off, and the other proceeds with the auto-configuration.

The unique identifiers can either be box serial numbers or some other unique identifier having the same format but which has been set by software. The source of the unique identifier is not material to the practice of the invention so long as each potential server's identifier is unique relative to the others. Note that the network addresses do not necessarily have anything to do with the unique identifiers used for resolving contention. The ability to set an arbitrary value by software can be used by a data collection system wishing to prevent complete reconfiguration of the spread as new nodes are added.

A configuration server keeps track of its immediate children. When, and if, a configuration server loses contention, it notifies its immediate children that they must restart before it terminates its services. The restarted children thus obtain new configuration information from the winning server. When a child server is asked to restart, it sends further notification to its children before doing so. In order to facilitate node tracking when contention results in reconfiguration, the location services will be notified, so that address updates can be published to interested applications.

Figure 6:
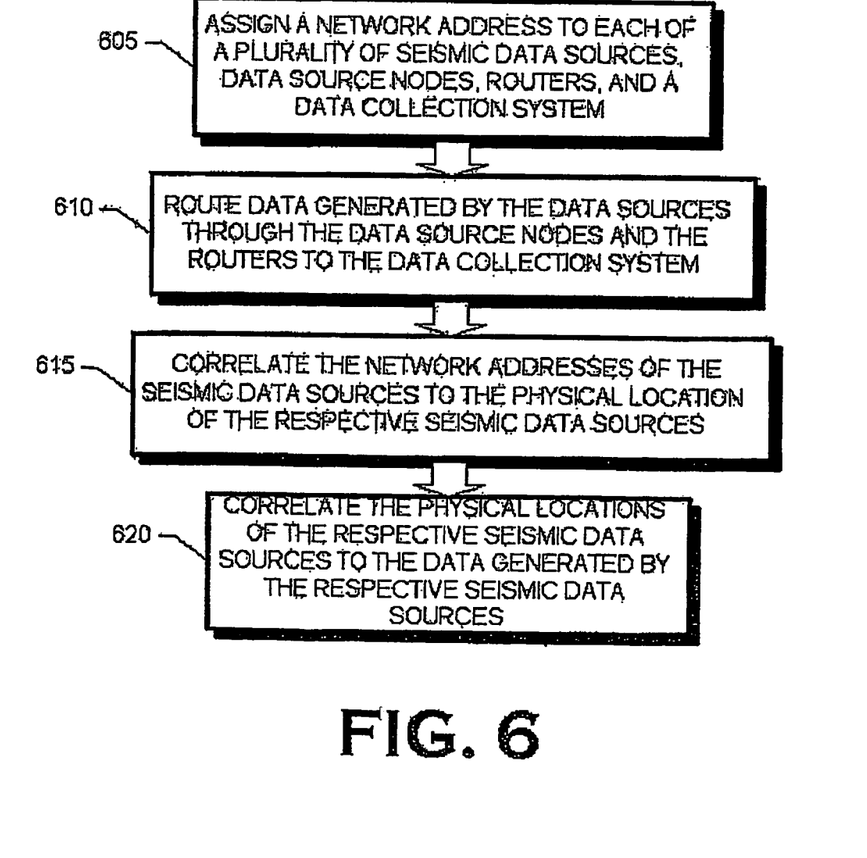
FIG. 6 depicts one embodiment of a method for use in a seismic survey in accordance with the present invention.

Thus, in operation, and as shown in FIG. 6, a respective network address is assigned (at 605) to each one of the seismic data sources, data sources data source nodes, routers, and data collection systems. Typically, this is performed by the line or backbone server 135 ($R_0$, $R_1$, or $R_{20}$), although this is not necessary to the practice of the invention. Should two different pieces of equipment attempt to assign addresses, the conflict is, in the illustrated embodiment, resolved through contention as described above. The addresses are assigned (at 605) each time the network infrastructure is configured. Thus, the addresses may be assigned (at 605) either upon power-up as the recording array is deployed, or upon reset, i.e., when the network infrastructure is automatically reconfigured for, e.g., a link going down or coming up.

Once the network infrastructure is up and running, with addresses assigned (at 605), data generated by the data sources is routed (at 610) through the data source nodes and the routers to a data collection system. The manner in which the data is packaged by the seismic data sources and routed will be implementation specific, depending on the particular open protocol in use. Again, the illustrated embodiment employs the IP protocol as its open protocol, but others may be used in alternative embodiments. Operation of the network infrastructure is synchronized as was described above using, in the illustrated embodiment, the NTP protocol.

The collected data is then processed. The processing involves first correlating the network addresses of the seismic data sources to the logical location of the respective seismic data sources (at 615). This involves first peg mapping the network addresses of the seismic data sources to their logical location in the recording array, as was discussed above. Next, the logical locations of the respective seismic data sources to the data generated by the respective seismic data sources is correlated (at 620). Ordinarily, the data is transmitted from the seismic data sources to the data collection system in packets. Each packet typically includes not only data, but a header that includes information such as the source and destination network addresses of the packet. Thus, the source network address can be extracted from the header of the packet and, having already been correlated to the logical location (at 615), the logical location can then readily be correlated to the data (at 620).

Figure 7A:
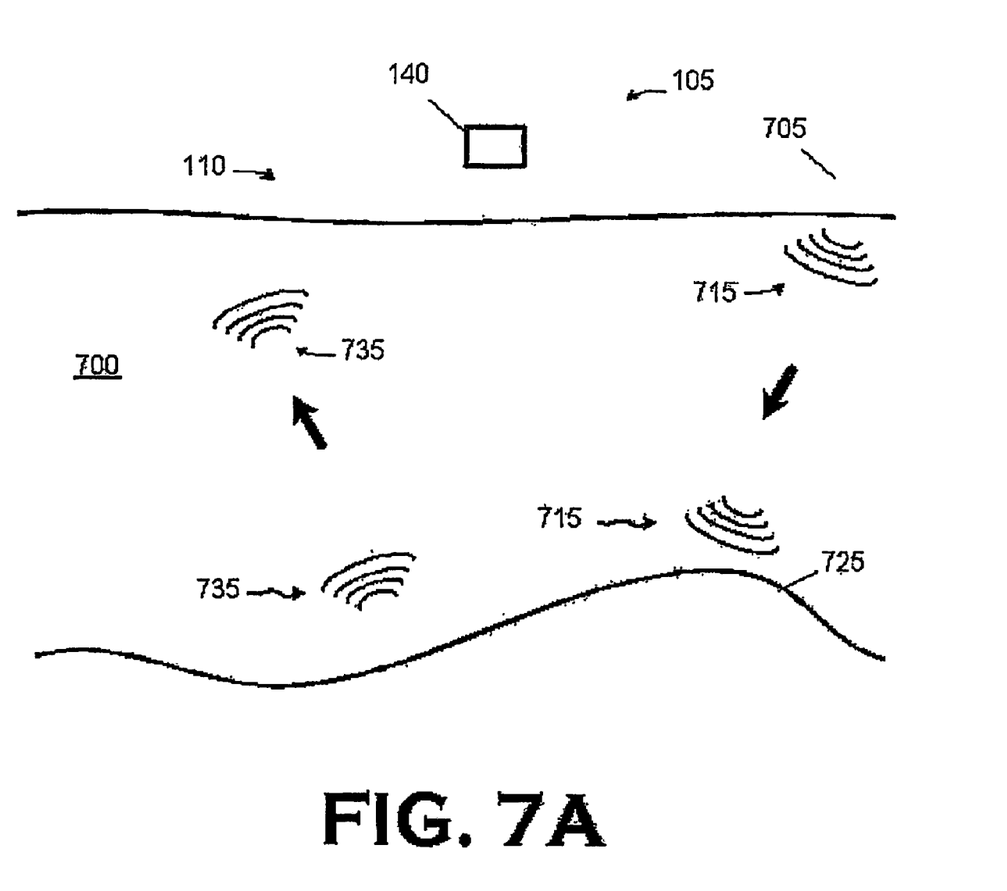
FIG. 7A and FIG. 7B illustrate the use of the present invention in a land-based seismic survey in one particular embodiment.
Figure 7B:
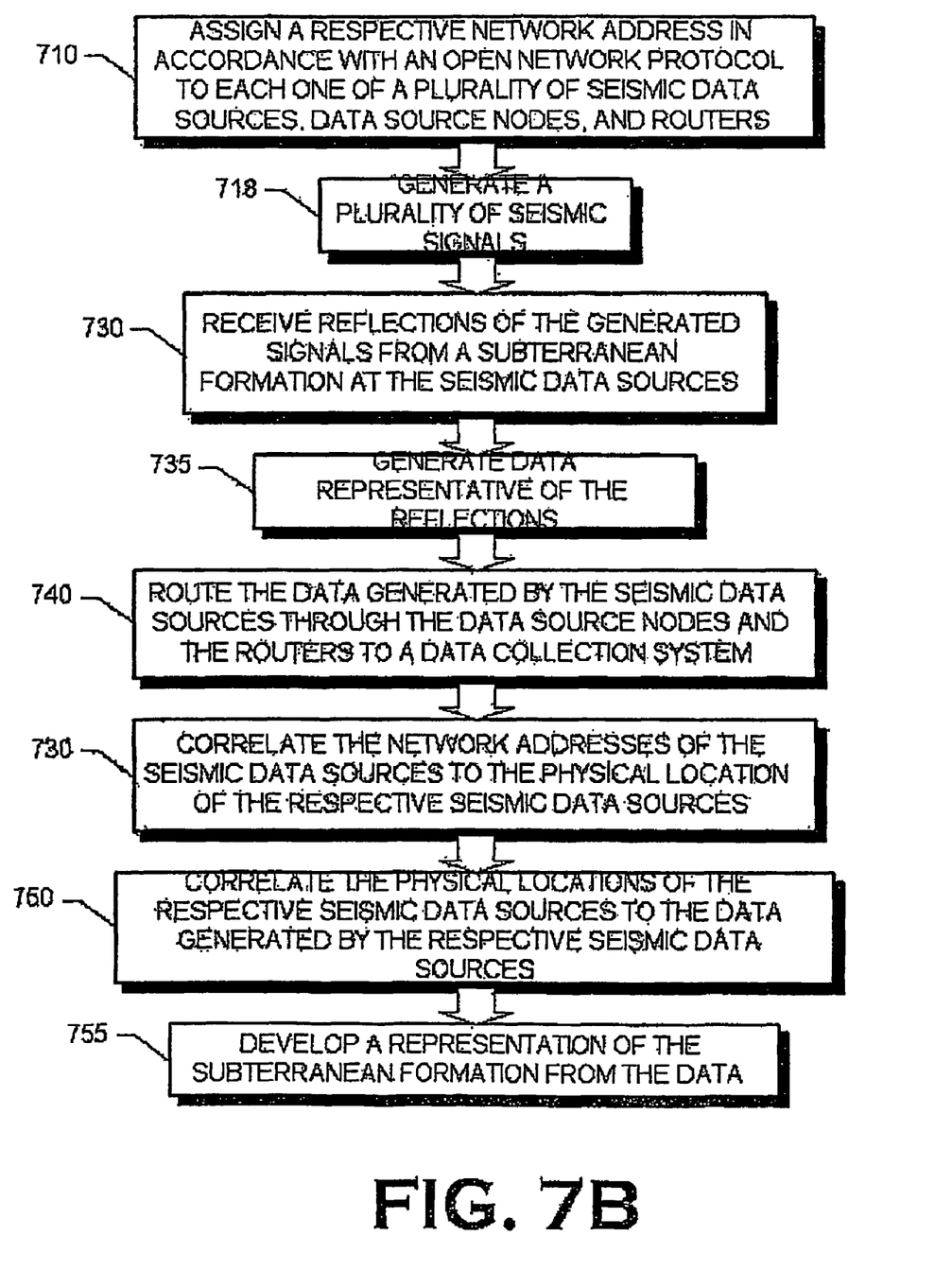

FIG. 7A and FIG. 7B illustrate the use of the present invention in a land-based seismic survey. FIG. 7A shows the seismic recording array 110, first shown in FIG. 1, connected to the recording truck 105. The seismic source 115 is also shown. The data collection system 140 is shown centrally located on the recording truck 105. However, as will be appreciated by those skilled in the art, various portions of the data collection system 140 may be distributed, e.g., across the recording array 110, in alternative embodiments.

Once the recording array 110 is assembled and deployed, a network address is assigned (at 710, FIG. 7B) in accordance with an open network protocol to each one of a plurality of seismic data sources 120, data source nodes 130, and routers 135 (all shown in FIG. 1). The seismic source 115 generates a plurality of seismic survey signals 715 (at 718, in FIG. 7B) in accordance with conventional practice. The seismic survey signals 715 propagate and are reflected by the subterranean geological formation 725. The seismic data sources 120 receive (at 730, FIG. 7B) the reflected signals 735 of the generated signals 715. Note that, although not shown, some of the seismic data sources 120 are also receiving positioning signals, e.g., GPS signals, in accordance with conventional practice.

The seismic data sources 120 then generate (at 738, in FIG. 7B) data representative of the reflections 735. In the illustrated embodiment, the seismic data sources 120 receiving positioning signals also generate data representative of the received positioning signals. The generated data is then routed (at 740, in FIG. 7B) from the seismic data sources 120 through the data source nodes 130 and the routers 135 to the data collection system 140 in accordance with the open network protocol. The data collection system 140 collects the data for processing. The data collection system 140 may process the data itself, store the data for processing at a later time, or transmit the data to a remote location for processing.

In the illustrated embodiment, the data collection system 140 processes the data itself. The data collection system 140 correlates the network addresses (at 745, in FIG. 7B) of the seismic data sources 120 to the physical location of the respective seismic data sources 120. This involves first determining the logical location of the network address in the recording array 110 using the peg mapping service as was described above. The actual position of the logical location is then determined. The determination of the actual position may be performed using any technique known to the art suitable to the seismic data sources being implemented and the data they generate. The physical locations of the respective seismic data sources 120 are then correlated (at 750, in FIG. 7B) to the data generated by the respective seismic data sources 120. The data is then used to develop (at 755, in FIG. 7B) a representation of the subterranean formation 725 from the data.

Some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fibre, or some other suitable transmission medium known to the art. The invention is not limited by these aspects of any given implementation.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. For instance, although the illustrated embodiment employs the invention in the context of a land-based survey, alternative embodiments may implement the invention seabed acquisition. In this alternative embodiment, the seismic data sources might include seismic sources such as a vibrator or an explosive charge, seismic receivers such as geophones, and positioning instruments such as GPS receivers. It is therefore evident that the particular embodiments disclosed above may be altered or modified and all such variations are considered within the scope and spirit of the invention. Accordingly, the protection sought herein is as set forth in the claims below.

The invention claimed is:

1. A seismic acquisition system, comprising:
a recording vehicle for collecting seismic data;
a plurality of data sources for generating the seismic data;
a data collection system utilizing an open network protocol, wherein the data collection system is stored on the recording vehicle;
a plurality of data source nodes, wherein each data source node is coupled to a portion of the plurality of data sources; and
a first router coupled to a second router, a portion of the data source nodes and the data collection system, wherein the first router is configured to route the seismic data generated by the portion of the plurality of data sources to the data collection system in accordance with the open network protocol, and wherein the first router is coupled to the second router via a single connection.

2. The seismic acquisition system of claim 1, wherein the first router routes data to the data sources.

3. The seismic acquisition system of claim 1, wherein each of the data source nodes is assigned at least two respective network addresses under the open network protocol.

4. The seismic acquisition system of claim 1, wherein the first router routes the seismic data generated by the data sources to the data collection system through the data source nodes and the second router in accordance with the open network protocol.

5. The seismic acquisition system of claim 1, wherein the data collection system is assigned at least two respective network addresses under the open network protocol.

6. The seismic acquisition system of claim 1, further comprising at least one line network having a land-based seismic cable or an ocean bottom cable.

7. The seismic acquisition system of claim 1, wherein the data sources include at least one of seismic sources, seismic receivers, and positioning instruments.

8. The seismic acquisition system of claim 7, where in the seismic sources include at least one of an air gun, a vibrator, and an explosive charge.

9. The seismic acquisition system of claim 7, wherein the seismic receivers include at least one of a hydrophone and a geophone.

10. The seismic acquisition system of claim 1, wherein the open network protocol includes the Internet Protocol.

11. The seismic acquisition system of claim 1, further comprising:
a synchronization service for synchronizing a plurality of clocks for the data collection system, the first router, the second router, the data source nodes, and the data sources; and
an auto-configuration capability for automatically reconfiguring the seismic acquisition system upon removal of the router, the second router, the data source nodes, or the data sources.

12. The seismic acquisition system of claim 11, wherein the synchronization service comprises the Network Time Protocol.

13. The seismic acquisition system of claim 1, further comprising:
 a location mapping service for generating a mapping between (a) network addresses of the data collection system, the first router, the second router, the data source nodes and the data sources and (b) physical locations of the data collection system, the first router, the second router, the data source nodes and the data sources;
 an auto-configuration capability for automatically reconfiguring the network upon the addition of an additional piece of seismic equipment.

14. The seismic acquisition network of claim 11, wherein the synchronization service tolerates changes in topology.

15. The seismic acquisition system of claim 11, wherein the synchronization service synchronizes the clocks hierarchically.

16. The seismic acquisition system of claim 11, wherein the synchronization service tolerates breaks in the attachment between at least one seismic data source and the line network.

17. The seismic acquisition system of claim 13, wherein the location mapping service maps: an order for the data collection system, the router, the data source nodes, and the seismic data sources; an orientation for each of the data collection system, the router, the data source nodes, and the seismic data sources; and a plurality of topology events.

18. The seismic acquisition system of claim 17, wherein the topology events include at least one of a link going up, a link going down, and a node address change.

19. The seismic acquisition system of claim 13, wherein the at least one data collection system comprises a plurality of data collection systems and the synchronization service, the location mapping service, and the auto-configuration capability are administered by more than one of the plurality of data collection systems.

20. A seismic acquisition system, comprising:
 a recording vehicle for collecting seismic data;
 a first line network having:
  a first plurality of data sources for generating the seismic data, wherein each seismic data source is assigned at least two network addresses;
  a first data collection system having at least two network addresses assigned thereto, wherein the first data collection system is stored on the recording vehicle;
  a first plurality of data source nodes, wherein each data source node is coupled to a portion of the first plurality of data sources via a first medium-bandwidth data path, and wherein each data source node of the first plurality of data source nodes is assigned at least two network addresses; and
  a first router coupled to a portion of the first plurality of data source nodes via the first medium-bandwidth data path and to the first data collection system via a high-bandwidth data path, wherein the first router is configured to route the seismic data generated by the portion of the first plurality of data sources to the first data collection system in accordance with an open network protocol, and wherein the first router is assigned at least two network addresses.

21. The seismic acquisition system of claim 1, wherein each seismic data source is assigned at least two network addresses under the open network protocol.

22. The seismic acquisition system of claim 20 further comprising:
 a second line network, wherein the second line network is coupled to the first line network via the high-bandwidth path and the second line network comprises:
  a second plurality of data sources for generating the seismic data, wherein each seismic data source of the second plurality of data sources is assigned at least two network addresses;
  a second data collection system having at least two network addresses assigned thereto;
  a second plurality of data source nodes, wherein each data source node of the second plurality of data source nodes is coupled to a portion of the second plurality of data sources via a second medium-bandwidth data path, and wherein each data source node of the second plurality of data source nodes is assigned at least two network addresses; and
  a second router coupled to a portion of the second plurality of data source nodes via the second medium-bandwidth data path, to the second data collection system via the high-bandwidth data path and to the first router via the high-bandwidth path, wherein the second router is configured to route the seismic data generated by the portion of the second plurality of data sources to the second data collection system in accordance with the open network protocol, and wherein the second router is assigned at least two network addresses, wherein the first router is coupled to the second router via a single connection, and wherein the first router communicates with the second router to determine a best path to route the seismic data based on dynamic routing and load balancing techniques.

23. The seismic acquisition system of claim 1, wherein a first seismic data source of the portion of the plurality of data sources is coupled to one of the plurality of data source nodes and to a second seismic data source of the portion of the plurality of data sources, and wherein the second seismic data source is coupled to the first seismic data source and a third seismic data source of the portion of the plurality of data sources.

24. The seismic acquisition system of claim 1, wherein the first router communicates with the second router to determine a best path to route the seismic data based on dynamic routing and load balancing techniques.

25. The seismic acquisition system of claim 20, wherein a first seismic data source of the portion of the plurality of data sources is coupled to one of the first plurality of data source nodes and to a second seismic data source of the portion of the plurality of data sources, and wherein the second seismic data source is coupled to the first seismic data source and a third seismic data source of the portion of the plurality of data sources.

* * * * *